US010223756B2

(12) United States Patent
Harpur et al.

(10) Patent No.: US 10,223,756 B2
(45) Date of Patent: Mar. 5, 2019

(54) ELECTRONIC MESSAGE REDACTING

(71) Applicant: International Business Machines Corporation, Armonk, NY (US)

(72) Inventors: Liam Harpur, Dublin (IE); Simon P. O'Doherty, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/947,124

(22) Filed: Nov. 20, 2015

(65) Prior Publication Data

US 2016/0173431 A1 Jun. 16, 2016

(30) Foreign Application Priority Data

Dec. 16, 2014 (GB) .................................. 1422362.2

(51) Int. Cl.
*G06Q 50/00* (2012.01)
*H04L 12/58* (2006.01)

(52) U.S. Cl.
CPC ............ *G06Q 50/01* (2013.01); *H04L 51/32* (2013.01)

(58) Field of Classification Search
CPC ..... G06Q 10/107; H04L 12/585; H04L 12/58; H04L 12/581; H04L 12/5855; H04L 29/08072; H04L 29/06
USPC ......................................................... 709/206
See application file for complete search history.

(56) References Cited

U.S. PATENT DOCUMENTS

| | | | | |
|---|---|---|---|---|
| 6,868,418 B1 * | 3/2005 | Avner | ............... | G06F 17/30286 |
| 7,822,745 B2 * | 10/2010 | Fayyad | ............. | G06F 17/30699 |
| | | | | 705/14.1 |
| 8,135,800 B1 * | 3/2012 | Walsh | ............... | G06F 17/30702 |
| | | | | 707/723 |
| 8,630,968 B2 * | 1/2014 | Sinha | ..................... | G06F 9/543 |
| | | | | 706/47 |
| 8,656,288 B2 | 2/2014 | Roger et al. | | |
| 8,707,184 B2 | 4/2014 | Chen et al. | | |

(Continued)

FOREIGN PATENT DOCUMENTS

| | | |
|---|---|---|
| WO | WO2010094626 A1 | 8/2010 |
| WO | WO2012/061318 A1 | 5/2012 |
| WO | WO2013/052923 A2 | 4/2013 |

OTHER PUBLICATIONS

Search Report under Section 17(5) dated Jun. 24, 2015, Application No. GB1422362.2, 4 pages.

(Continued)

*Primary Examiner* — Mahran Y Abu Roumi
(74) *Attorney, Agent, or Firm* — Francis Lammes; Stephen J. Walder, Jr.; William J. Stock

(57) ABSTRACT

A mechanism is provided for controlling the content of an electronic message on an electronic messaging system including a plurality of communities that facilitates the tailoring of the content of a posted electronic message to the interests and/or access privileges of such communities. An electronic lexicon is provided for each community, the lexicon defining content relevant to the community. The electronic message is interpreted for disclosure to a particular community to identify content in the message relating to content in the electronic lexicon of the particular community. The electronic message is redacted based on the identified related content if the electronic message contains content in a form unsuitable for the disclosure.

18 Claims, 8 Drawing Sheets

(56) References Cited

U.S. PATENT DOCUMENTS

| | | | |
|---|---|---|---|
| 8,756,278 B2 | 6/2014 | Sittig et al. | |
| 8,812,499 B2 | 8/2014 | Sathish et al. | |
| 9,282,076 B2* | 3/2016 | Buddenbaum | H04L 51/32 |
| 2005/0108351 A1* | 5/2005 | Naick | G06Q 10/107 |
| | | | 709/207 |
| 2006/0224584 A1* | 10/2006 | Price | G06F 17/30616 |
| 2007/0100950 A1* | 5/2007 | Bornstein | G06Q 10/107 |
| | | | 709/206 |
| 2008/0104032 A1* | 5/2008 | Sarkar | G06F 17/3089 |
| 2009/0198778 A1* | 8/2009 | Priebe | H04L 12/1822 |
| | | | 709/206 |
| 2009/0235280 A1* | 9/2009 | Tannier | G06Q 10/00 |
| | | | 719/318 |
| 2010/0094626 A1* | 4/2010 | Li | G10L 15/02 |
| | | | 704/234 |
| 2010/0229246 A1* | 9/2010 | Warrington | G06F 21/6218 |
| | | | 726/28 |
| 2010/0313239 A1* | 12/2010 | Chakra | G06F 21/6218 |
| | | | 726/2 |
| 2011/0016479 A1 | 1/2011 | Tidwell et al. | |
| 2011/0282732 A1 | 11/2011 | Bax et al. | |
| 2011/0307791 A1 | 12/2011 | Pierre et al. | |
| 2012/0075124 A1* | 3/2012 | Whitlow | G08G 5/0021 |
| | | | 340/971 |
| 2012/0124139 A1 | 5/2012 | Dempski | |
| 2013/0251147 A1* | 9/2013 | Bonatto | H04L 9/06 |
| | | | 380/255 |
| 2014/0040761 A1 | 2/2014 | Liu et al. | |
| 2014/0180788 A1* | 6/2014 | George | G06Q 30/0269 |
| | | | 705/14.41 |
| 2014/0359022 A1* | 12/2014 | Buddenbaum | H04L 51/32 |
| | | | 709/206 |
| 2015/0286953 A1* | 10/2015 | Papadopoullos | G06F 17/2785 |
| | | | 706/12 |
| 2016/0034560 A1* | 2/2016 | Setayesh | G06F 17/2785 |
| | | | 707/739 |
| 2017/0308523 A1* | 10/2017 | Wang | G06Q 10/10 |

OTHER PUBLICATIONS

Peddinti, Sai T. et al., "Cloak and Swagger: Understanding Data Sensitivity Through the Lens of User Anonymity", 2014 IEEE Symposium on Security and Privacy (SP), http://www.ieee-security.org/TC/SP2014/papers/CloakandSwagger_c_UnderstandingDataSensitivityThroughtheLensofUserAnonymity.pdf, San Jose, CA, May 18-21, 2014, 16 pages.

Savage, Saiph et al., "Visualizing Targeted Audiences", COOP 2014 Proceedings of the 11th International Conference on the Design of Cooperative Systems, http://www.cs.ucsb.edu/~holl/pubs/Savage-2014-COOP.pdf, France, May 27-30, 2014, 16 pages.

* cited by examiner

ELECTRONIC MESSAGE REDACTING

BACKGROUND

The present invention relates to a method of controlling the content of an electronic message on an electronic messaging system.

Nowadays, information is routinely disseminated using social media, i.e. electronic messaging systems such as Facebook, Twitter, and LinkedIn to name but a few of many examples. Other examples may include enterprise or other business forums where users post messages to disseminate such information.

An author of such an electronic message typically intends to reach the widest possible target audience on the electronic messaging system. However, this objective is not always achieved because the message may not be drafted in such a manner that it appeals to at least some members of the target audience. In particular, the electronic message may contain content that is not of interest to or cannot be understood by these members.

At the same time, such an electronic message may contain restricted content that should only be accessible to some members of the target audience, e.g. members of certain communities. In other words, the audience of the electronic messaging system having access to the message may contain members to which some of the content of the message should not be disclosed.

It is often practically impossible for the author of the message to define a set of rules or otherwise compile the message such that the message content meets the needs of every community having access to the message. For instance, the author simply may not possess the knowledge of the composition of the community or the author may be a member of many different communities such that it simply is impossible to meet the needs of every community, for instance because different communities may have conflicting requirements.

In U.S. Pat. No. 8,630,968 B2, mechanisms are provided directed toward monitoring a user's interaction with a website when the user is utilizing an enterprise device to conduct the interaction. The monitoring of the interaction can lead to the generation of one or more automated responses to control the interaction in accordance with enterprise policy or rules. The types of interactions which can be controlled include interactions where the user is attempting to post data on the website. This may be used to prevent a user from posting inappropriate data on the website. However, such control does not take into consideration the target audiences of the user, such that the posted message may still provide content that is irrelevant to at least certain parts of the audience, which may hamper dissemination of the relevant content to the intended audiences, for instance because the relevant content is hidden in an electronic message that does not appeal to the intended audience or because the relevant content is not provided in a suitable form.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for controlling the content of an electronic message on an electronic messaging system including a plurality of communities. The illustrative embodiment provides a separate electronic lexicon for each community in the plurality of communities, each lexicon defining content relevant to its associated community. The illustrative embodiment interprets the electronic message for disclosure to a particular community to identify content in the electronic message relating to content in the electronic lexicon of the particular community. The illustrative embodiment redacts one or more pieces of content in the electronic message based on the identified related content responsive to the electronic message comprising content in a form unsuitable for the disclosure, thereby forming a redacted electronic message. The illustrative embodiment posts the redacted electronic message to the electronic messaging system.

In other illustrative embodiments, a computer program product comprising a computer-readable storage medium is provided. The computer readable program, when executed on a computer system, causes the computing device to perform various ones of, and combinations of, the operations outlined above with regard to the method illustrative embodiment.

According to yet another aspect, In yet another illustrative embodiment, there is provided a computer system is provided, comprising the aforementioned computer program product and a processor arrangement communicatively coupled to the computer program product and adapted to execute said instructions. Such a computer system, which also may host the electronic messaging system, therefore benefits from the inclusion of the computer program product in that computer system may produce data, i.e. messages, having content tailored to a particular audience. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
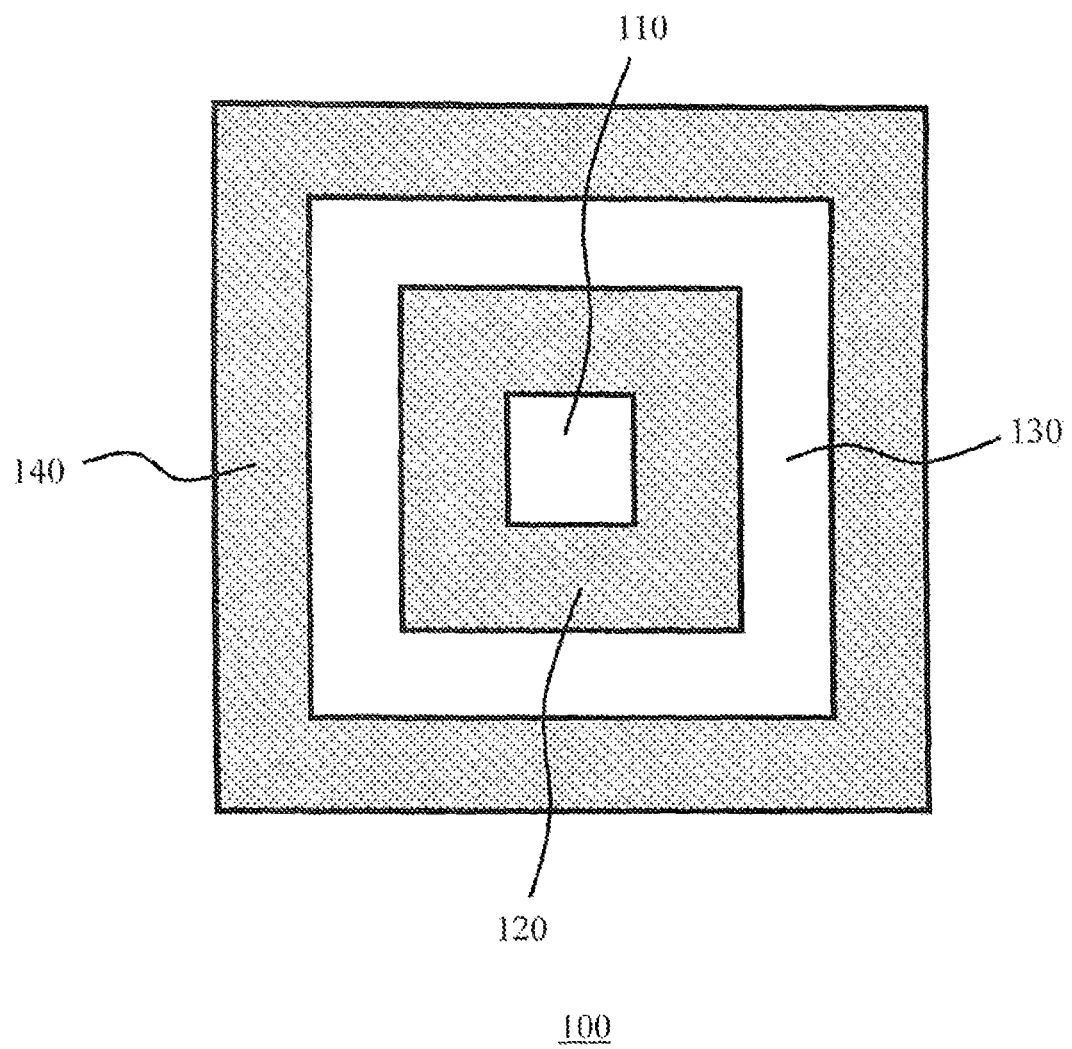
FIG. 1 schematically depicts a hierarchical structure of an electronic messaging system according to an embodiment.

It should be understood that the Figures are merely schematic and are not drawn to scale. It should also be understood that the same reference numerals are used throughout the Figures to indicate the same or similar parts.

In the context of the present application, reference is made to an electronic messaging system. Such a system may be a hosted application that facilitates the posting of messages to the system by a user for access by another user, Such an electronic message may take any suitable shape, e.g. a tweet, blog, and so on. The electronic messaging system typically is accessible over a communication network, which may be a closed communication network such as an enterprise network, e.g. an enterprise LAN or the like, or may be an open communication network, e.g. the Internet or the like. The electronic messaging system may be implemented in any suitable manner, such as an electronic database comprising a plurality of data records in which each data record may hold one or more electronic messages. Other suitable implementations of such systems, e.g. tree-like implications will be immediately apparent to the skilled person as such electronic messaging systems are well-known per se.

In at least some embodiments, the present invention seeks to tailor the content of electronic messages posted to the electronic messaging system for instance based on established information regarding the interests, knowledge and/or clearance of a target audience or any other suitable criterion to which the electronic message is potentially addressed in order to improve the relevance or suitability of the electronic message to its target audience. At least some of such tailoring may be provided prior to posting the electronic message to the electronic messaging system. Alternatively or additionally, at least some of such tailoring may be provided upon a member of a particular target audience attempting to access the electronic message. In the context of the present application, a message may be a document, forum post, blog entry, and so on. Typically, such a message is characterized by comprising unstructured data, e.g. written text.

The established information may be collected in a dictionary or lexicon associated with such a particular target audience, e.g. a particular community, which information may be collected either by ad hoc compilation or by content analysis of electronic messages posted to the particular target audience, e.g. messages posted to a particular community or group as will be explained in more detail below.

FIG. 1 schematically depicts a hierarchical structure 100 that may be applied to an electronic messaging system in accordance with embodiments of the present invention. Central to this structure is a user 110, as will be explained in further detail below may be the author of the electronic message to be posted to the electronic messaging system or a reader of an electronic message previously posted to the electronic messaging system. Such a user is typically a member of one or more hierarchies 120, which may be a community of users sharing particular interests. A hierarchy 120 may form part of a larger community 130. In some embodiments, this separation may not be present, i.e. the separate hierarchical layer 120 may be omitted from the hierarchical structure 100. A global administration layer 140 may also be present if message content control, which will be explained in further detail below, may need to be provided beyond the hierarchical level 120 and/or the community level 130.

Figure 2:
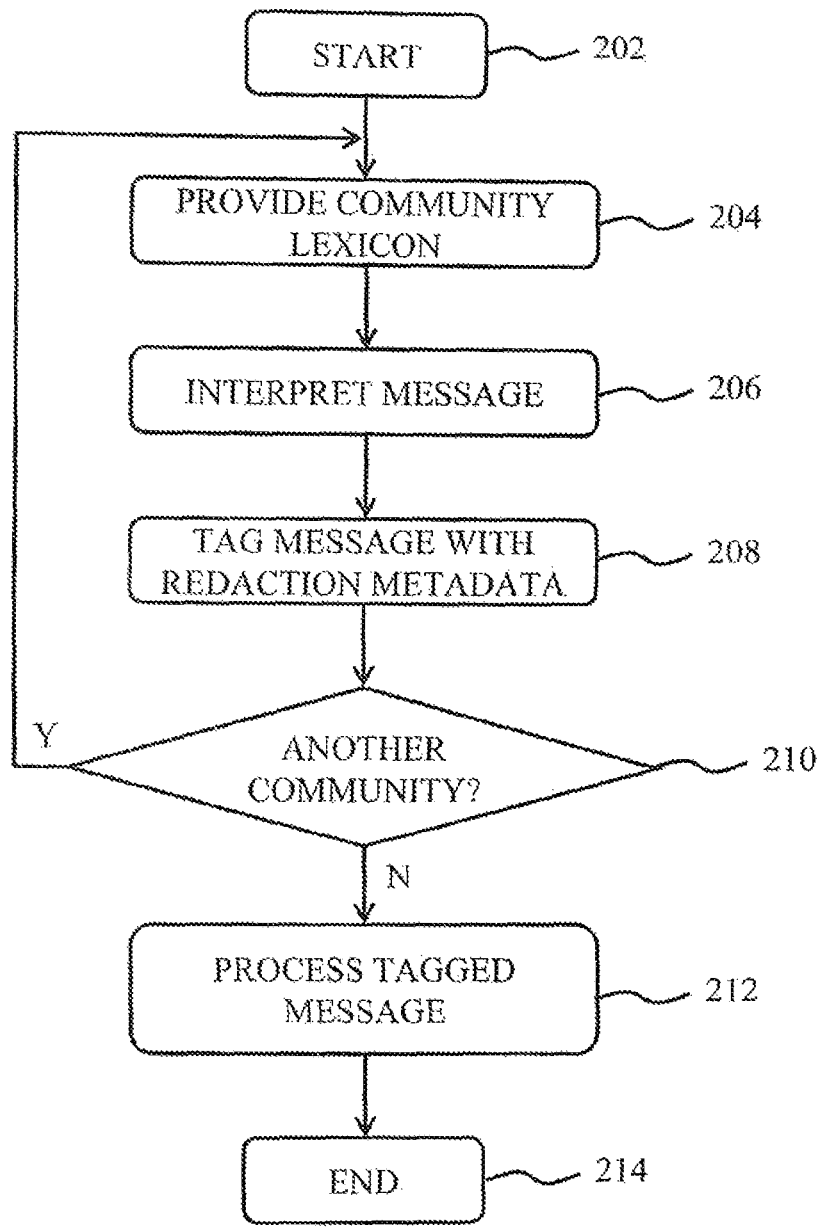
FIG. 2 is a flowchart of an electronic message content control method according to an aspect.

FIG. 2 is a flow chart of a method 200 of controlling the content of an electronic message on an electronic messaging system including a plurality of communities according to an embodiment. The method 200 starts in step 202, in which a user, e.g. an author, accesses the electronic messaging system in order to create a new message to be posted to the system, e.g. by opening a dialogue box or the like in which such an electronic message may be compiled. The user is typically a member of a number of communities of the electronic messaging system, such that the message to be compiled by the user may be accessed by these communities once posted to the electronic messaging system.

In order to ensure that each community is presented with an electronic message tailored to that particular community, in step 204 the lexicon is provided for a particular community of which the user is a member. The lexicon typically comprises indications of content relevant to the particular community, such as keywords or descriptions of topics of interest, such that the content of the message compiled by the user can be interpreted against these indications in order to determine if the content created by the user matches the content relevant to the particular community. The lexicon may further comprise indications of the level of knowledge of an average member of the particular community, as well as indications of content that should not be disclosed to a particular community, i.e. restricted content, for instance because of reasons of confidentiality. It should be understood that these are just some examples of what type of information may be comprised by such a lexicon, and that other examples will be apparent to the skilled person.

A lexicon of a particular community may be created in any suitable manner, for instance by manual compilation of the lexicon using knowledge about the typical members of the relevant community. However, this may be a time-consuming process that may not always yield satisfactory results, for instance because the creator of the lexicon has insufficient knowledge about the characteristics of the community that determine the content of the lexicon, which for instance may be the case for large and/or diverse communities. Therefore, in an alternative embodiment the lexicon may be built automatically. This for instance may be achieved by evaluating the content of electronic messages previously posted to the community and identifying content, e.g. by identifying keywords either in isolation or within a particular context, or by identifying and registering context relating to a particular subject, and so on. The evaluation may consider the unstructured data in such messages, e.g. written text, as well as tags, metadata, authorship, editorship and other information that can be used to assess the relevance of the message and/or content thereof. A thus created lexicon may be stored in any suitable manner for accessing by the methods of the present invention, e.g. on a computer system hosting or providing access to the electronic messaging system for access by the method of the present invention.

In an embodiment, such a lexicon may be built by evaluating the messages of the community and determining an weight factor, e.g. a frequency score, for particular content in these messages in order to determine if certain content appears more regularly in such messages than other, and building the lexicon based on identified content for which the weight factor exceeds a defined threshold, such that the content deemed relevant to the community is determined with a certain degree of certainty as provided by the occurrence metric. For instance, natural language processing algorithms may be employed to scan the message data for concept affinities, density of a concept contained within the material versus existing corpus information, as well as usual word density and/or frequency and unusual word placement, e.g. a possible noun used in the context of an adverb. The age of the documents, i.e. messages and/or their version may be also factored into the scoring. Such a weight factor threshold may be defined globally or specific to each lexicon, for instance by an administrator.

The thus extracted content may be ranked within the lexicon in order of relevance, e.g. by assigning a weight factor such as a relevance score to the content, e.g. extracted terms, such that the lexicon may include a ranking structure based on such weight factors. This for instance facilitates truncated searches of such a lexicon in case the consideration of the entire lexicon is undesirable for some reason in which only the most relevant content, e.g. terms, for a particular community is considered. For example, different lexicons may contain different numbers of instances of relevant content with different weight factors, wherein by applying a weight factor threshold when considering the lexicon content it is ensured that for each considered lexicon only content having a guaranteed minimum relevance is considered in the message redaction process to be explained in further detail below.

In order to ensure that such a lexicon remains up-to-date, the messages directed or belonging to the community may be periodically updated, for instance by determining adjustments to the weight factor of the relevant content in messages that are added to the community or deleted therefrom using the aforementioned processing techniques.

In addition to this building of the lexicon based on natural language evaluation of the community messages, one or more iterations of machine learning using unsupervised algorithms may be applied to adjust the weight factors, i.e. ranking scores, of the classified content. Multiple learning pipelines may be used that independently score the content, which independent scores may be subsequently normalized and used to correct the ranking of the content in the lexicon, e.g. relevant terms. This allows for the lexicon accuracy to be improved by applying new classification systems without losing accuracy of the existing pipelines.

In an embodiment, further refinement of the lexicon may be achieved by considering confidentiality of certain content of relevance to the community. This for instance may be achieved by a further classification step that may detect such confidential content by looking for contextual information detailing the nature of the content within the message data through standard semantic analysis. This allows the lexicon to learn what part of the community domain language can be discussed outside of the community without explicit administrator intervention.

In an embodiment, the lexicon may be further refined by determining if for some of the content the typical knowledge of the members of the community is insufficient to fully appreciate the content, in which case such content may be flagged as content requiring additional information, which additional information may be added to a message available to the community that comprises such content upon a member of the community accessing the message. For instance, such additional information may be provided in the form of a link to a webpage explaining the content, e.g. a Wikipedia page or the like, or by explicitly inserting the explanation into the original message as will be explained in more detail below.

The contents compiled in such a lexicon may be classified using ranking terms as previously explained. These ranking terms may for instance contain the pipeline scoring and other metadata, e.g. Common Analysis System (CAS) metadata. This for instance facilitates an administrator of the community to evaluate the raw CAS (Common Analysis System) metadata to determine how relevant content is classified, as well as to adjust scores/normalization levels of the relevant content based on his or her knowledge of the community interests. In addition, such an administrator may add rules to the community lexicon, e.g. confidentiality rules and the like that force the deletion or replacement of certain terms in a message under evaluation. For instance, the administrator may define a rule that causes the method 200 to replace certain restricted terms with more generic terms, e.g. a specific customer name with a more generic indication, e.g. "Customer", an internal project name with a name under which the project is known to the outside world, the deletion of defined sensitive information, and so on.

Figure 3:
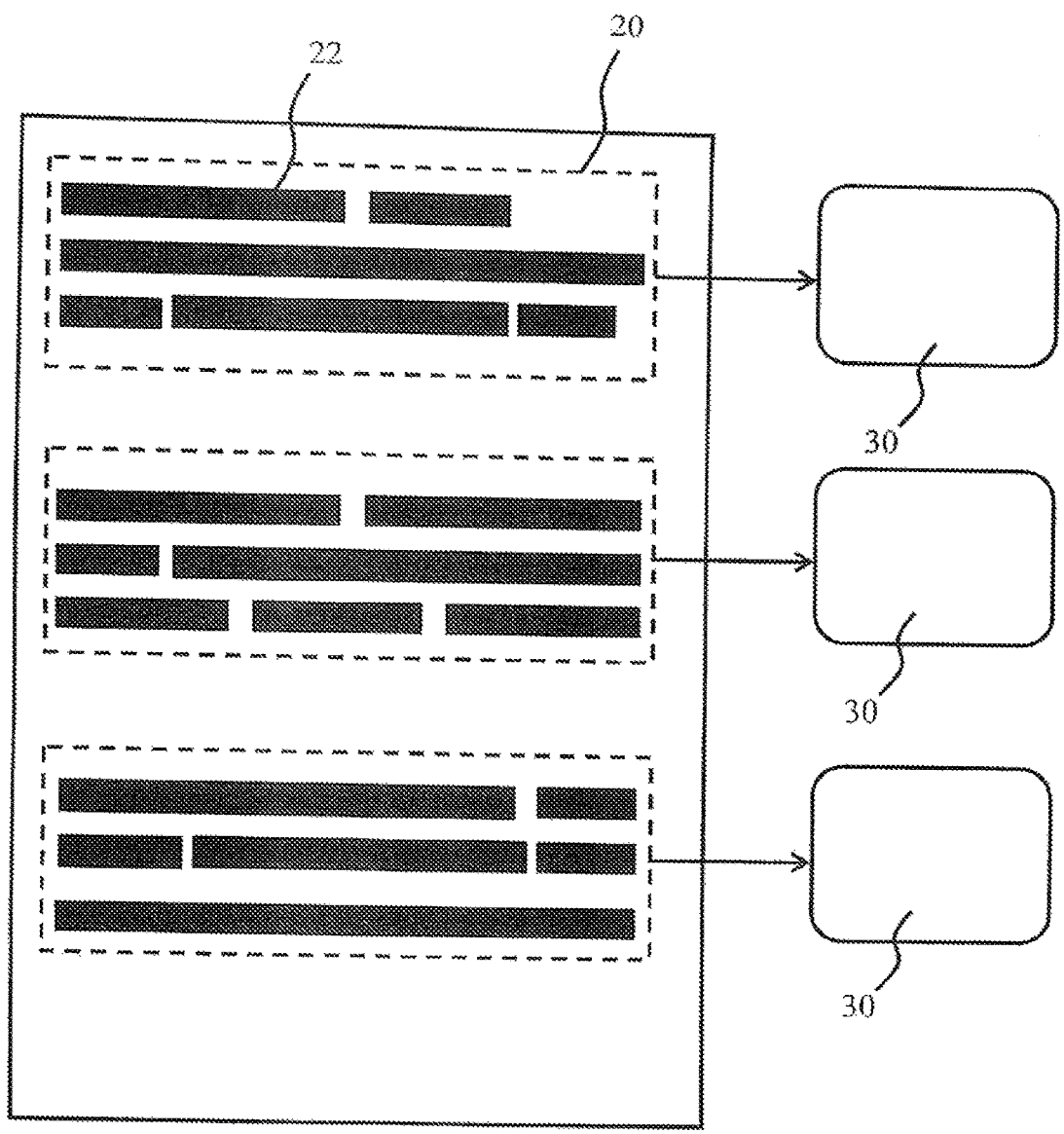
FIG. 3 schematically depicts an electronic message annotated in accordance with the method of FIG. 2.

Upon the provision of the lexicon of a particular community of which the author of the message is a member, the method 200 proceeds to step 206 in which the message content, i.e. unstructured data is interpreted, i.e. evaluated in order to determine if the message contains content relevant to the community as specified in its lexicon. An example embodiment of such an interpretation method is explained with the aid of FIG. 3, which schematically depicts a message 10 comprising unstructured data 22. In an embodiment, after the user completes and submits their message 10 to the electronic messaging system, the system performs an evaluation using the provided lexicon in which the unstructured data 22 is annotated into blocks 20 based on criteria of the lexicon, e.g. using the CAS metadata. The electronic messaging system subsequently attempts to determine the likelihood of the submitted content in the blocks 20 being related to the relevant content in the lexicon of the community. This for instance may be achieved through standard unsupervised machine learning, using the CAS objects as the basis for the classification. As such evaluation techniques are well-known per se, this will not be explained in further detail for the sake of brevity.

In an embodiment, relevant content may be identified in the message 10 by determining a confidence score for the content that expresses the degree of confidence that the content is indeed related to content in the lexicon of the particular community. Only content having a confidence score exceeding a determined threshold may be considered relevant to that particular community. Such a confidence threshold may be defined at the system level and applied to all community lexicons or alternatively may be individually defined for each lexicon, for instance by an administrator of a community message board.

Step 206 may further comprise sub step in which the identified content in a message 10 to be relevant to the particular community is further evaluated against the lexicon of that community to determine if further information, e.g. learning information to improve the knowledge of the community on that particular content, needs to be added to the message 10.

Upon the identification of such a relevant content, the method 200 proceeds to step 208 in which the identified content in the message 10 is tagged with metadata 30 containing redaction instructions for tailoring the message 10 such that upon accessing the message then by a member of the community which lexicon was used to determine the relevant content the message 10 may be redacted in accordance with the metadata 30. Such redaction instructions may include any of the redaction of specific words, sentences and/or paragraphs from the message 10 in order to make the redacted terms more appropriate to the community of interest, deletion of irrelevant or prohibited subject matter from the message 10, insertion of learning content or links thereto as previously explained, and so on. In an embodiment, such redaction instructions may further comprise access control information, for instance to prevent a member of a particular community accessing the message 10 upon attempting to read it, for instance because the message 10 may contain content that that particular community is prohibited from gaining access to.

Figure 4:
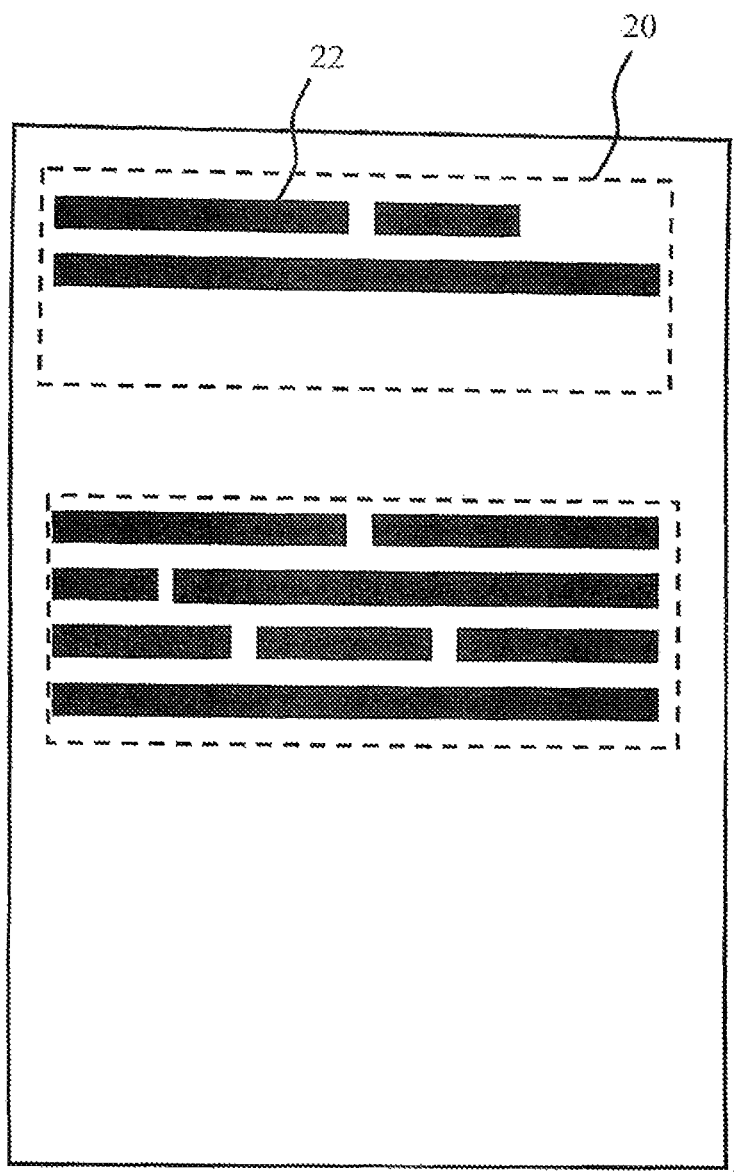
FIG. 4 schematically depicts an electronic message redacted in accordance with the method of FIG. 2.

Next, it is checked in step 210 if the author of the message is a member of further communities, in which case the method refers back to step 204 in which the lexicon of the next community of which the author is a m ember is provided and the interpretation and annotation with metadata 30 of the message is repeated for that lexicon. Once all communities of which the author is a member have been processed in that manner the method proceeds to step 212 in which the tag message may be processed, e.g. posted to the electronic messaging system such that when the message is accessed by a member of a community of which the author is a member, the message 10 will be redacted in accordance with the metadata 30 to provide the reader of the message with the accordingly redacted message, with the method ending at step 214, An example of such a redacted message 10 is schematically depicted in FIG. 4 in which it can be seen when comparing the redacted message 10 in FIG. 4 with the message 10 in FIG. 3 that some of the unstructured data 22 of the blocks 20 in the original message 10 has been removed and some of the unstructured data 22 of the blocks 20 in the original message 10 has been altered in accordance with the metadata 30 of relevance to that particular reader, thereby pro viding that reader with a message that is tailored to the interests and access privileges of that reader.

Figure 5:
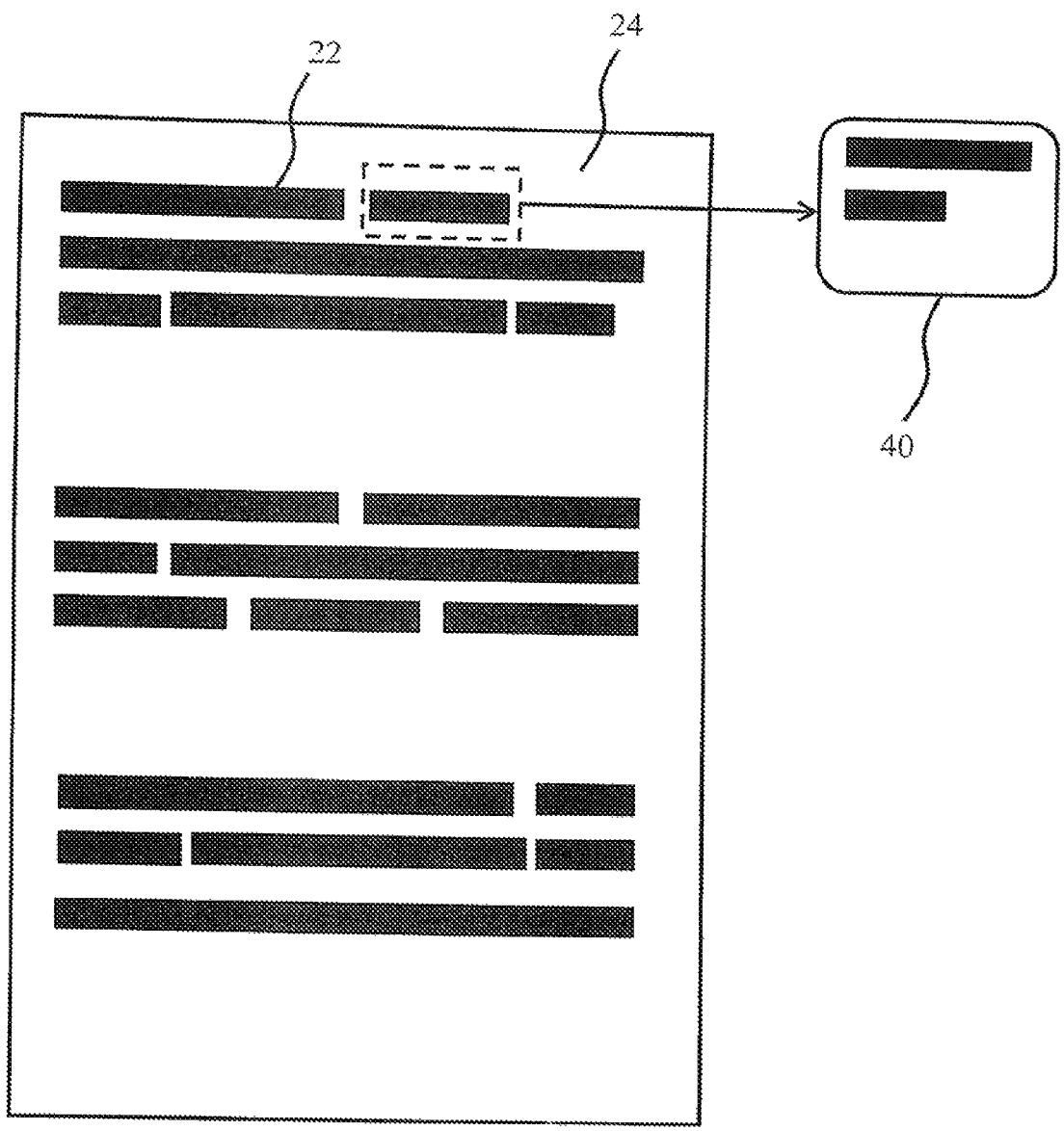
FIG. 5 schematically depicts an electronic message processed in accordance with the method of FIG. 2 during compilation of the message.

In an embodiment, the interpretation step(s) 206 may be performed during the compilation of the message 10 prior to posting of the message by its author. This for instance may be used to alert the author that certain parts of the message will be redacted when the message is posted to the electronic messaging system such that the author may improve the relevance of the message 10 for his or her target audience prior to posting. To this end, the author may be provided, e.g. by displaying on a computer screen on which the author is writing the message, with feedback information 40 as for instance is schematically depicted in FIG. 5. Such feedback information 40 for instance may comprise a warning that the target audience may not understand some of the written information 24 of the unstructured data 22, that certain content will be restricted to certain communities, e.g. because it is sensitive information, or that certain content may require expanding on because it is of particular relevance to some of the communities of which the author is a member, e.g. because the content has a high ranking in the lexicon of such a community.

In an embodiment, such feedback information 40 may include a notification that the author will not be allowed to post the message 10 to the electronic messaging system because it contains confidential information that cannot be disclosed to the intended target audiences. In this case, the author may be asked to remove such content or to limit the target audience to which the message is to be posted, for instance by indicating that the message is to be posted to specific communities only that are entitled to have access to the confidential information.

Such feedback information 40 may be provided at any suitable point during the creation of the message 10, e.g. during writing or during an attempt to post the message 10 to the electronic messaging system. In the latter scenario, the system may for instance ask the author to confirm that the message 10 should indeed be posted in its present form despite the fact that the message will be redacted when accessed by at least some communities in order to provide the author with the opportunity to adjust the message 10 in accordance with the provided feedback information 40.

When a member of a particular community to which the author of the message 10 is a member and for which redaction metadata 30 has been included in the message 10 subsequently opens the message, the message will be redacted in accordance with the redaction instructions defined by the metadata 30 for that particular community such that these reader is provided with a redacted version of the message 10 that has been tailored to the interests and/or privileges of that particular reader. In case the reader is a member of multiple communities for which metadata 30 is included in the message 10, a decision-making process may be applied that decides which community is the most relevant community for that particular reader, which for instance may be based on the number of times the reader has posted to or accessed that community forum, in order to determine which metadata 30 should be applied for redacting the message 10, It should be understood that this determination process may take any suitable form.

In addition to the metadata 30, reader-specific information that is available to the system, such as browsing history, may be used to further shape the message to be displayed to the reader. For instance, the browsing history may indicate that the reader has a preference for short or long messages, which information may be used to further redact the message prior to displaying it to the reader, e.g. by including or excluding content having a relatively low confidence score regarding the relevance of that content to a particular community to which the reader belongs.

In an embodiment, when such a redacted message is created using the metadata 30, the redacted message may further comprise a link to the original message (i.e. the unredacted message) such that the reader may access the original message if of interest. However, this does require a check to determine if the original message contains subject matter that was redacted, i.e. excluded or otherwise amended, for confidentiality reasons of like such that the reader cannot gain access to such a restricted content by simply clicking on the original message link. This will be explained in more detail below.

Figure 6:
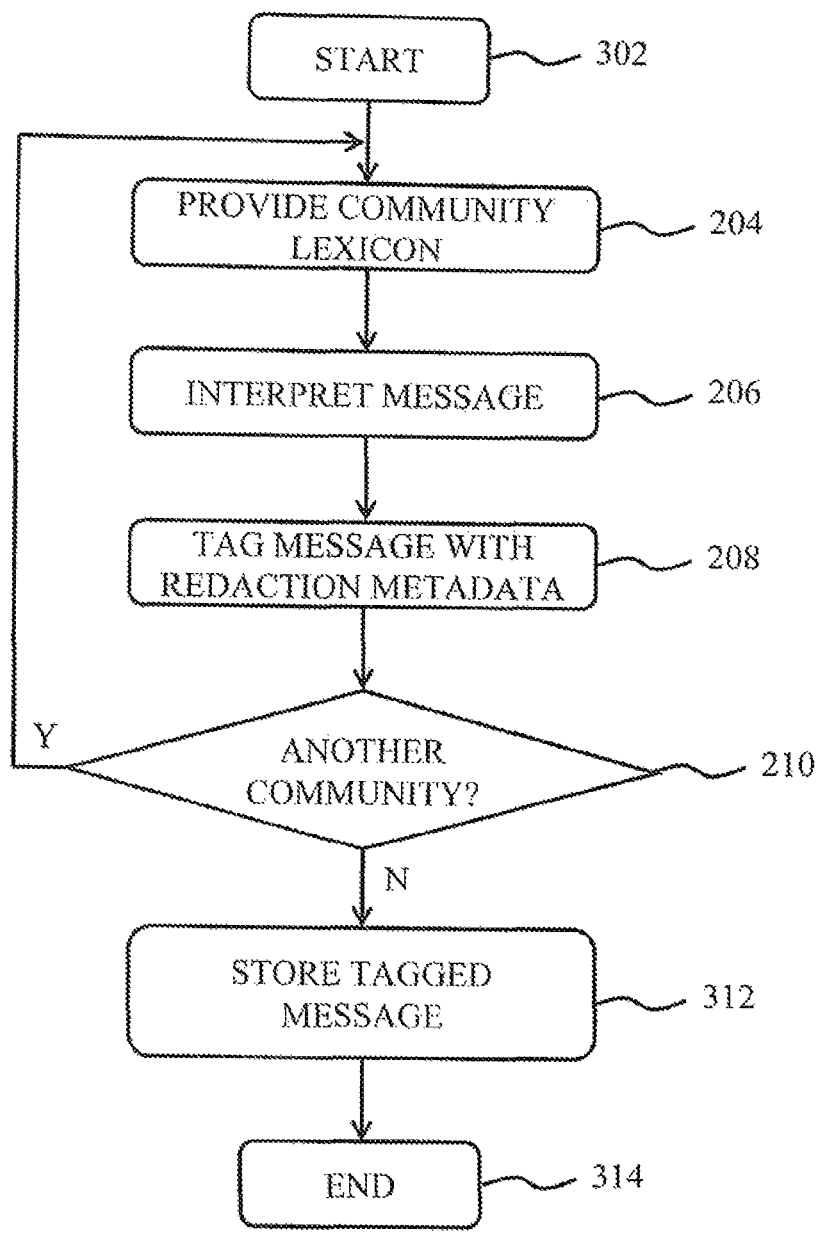
FIG. 6 is a flowchart, of an electronic message content control method according to another aspect.

FIG. 6 is a flow chart of a method 300 that may be invoked when a user of the electronic messaging system, i.e. a member of one or more particular communities attempts to share a previously posted message that has been tagged with redaction instructions, for instance by attempting to post the message to their feed. In step 302, the reader attempts to share the posted message, which triggers the method 300 to check which communities the reader is a member of. In this check, communities already covered in the metadata 30 of the accessed message will be ignored as for these communities the redaction instructions are already present in the accessed message.

For communities not yet covered by the metadata 30, the message 300 applies previously explained steps 204, 206, 208 and 210 until all hitherto uncovered communities with which the reader attempts to share the message have been evaluated and the message tagged with the relevant redaction instructions for these new communities. Once all communities of which the reader is a member have been processed in that manner the method proceeds to step 312 in which the tag message is stored, e.g. posted to the electronic messaging system associated with the reader, with the method ending at step 314.

In an embodiment, after the content of the message to be shared has been interpreted against the various lexicons of these new communities, a separate step (not shown) may be applied in which it is decided if the message requires additional information, for instance to explain certain content in more detail. Such additional information may be included upon accessing the tagged message without reference to a particular community, i.e. the additional information may be made available to all communities having access to the tagged message. In such a scenario, it may be desirable to determine the most relevant community or communities of which the reader is a member in order to maximize the likelihood that the additional information to be included in the tagged message upon opening is indeed of interest or relevant to the majority of the target audience of the reader sharing the message. This for instance may be achieved by determining a confidence score for each community the reader is a member of as previously explained, e.g. by determining the number of messages posted by the reader to the community, by determining the access frequency of a message board of the community by the reader, and so on. The community having the highest confidence score may be used to determine if such learning information should be included in the message. In case of a deadlock between communities having equal confidence scores, any suitable selection criterion for picking one of the communities to be used in this determination may be applied, such as a virtual coin flip, first occurring community in an alphabetically ordered list, youngest or oldest community, and so on.

Figure 7:
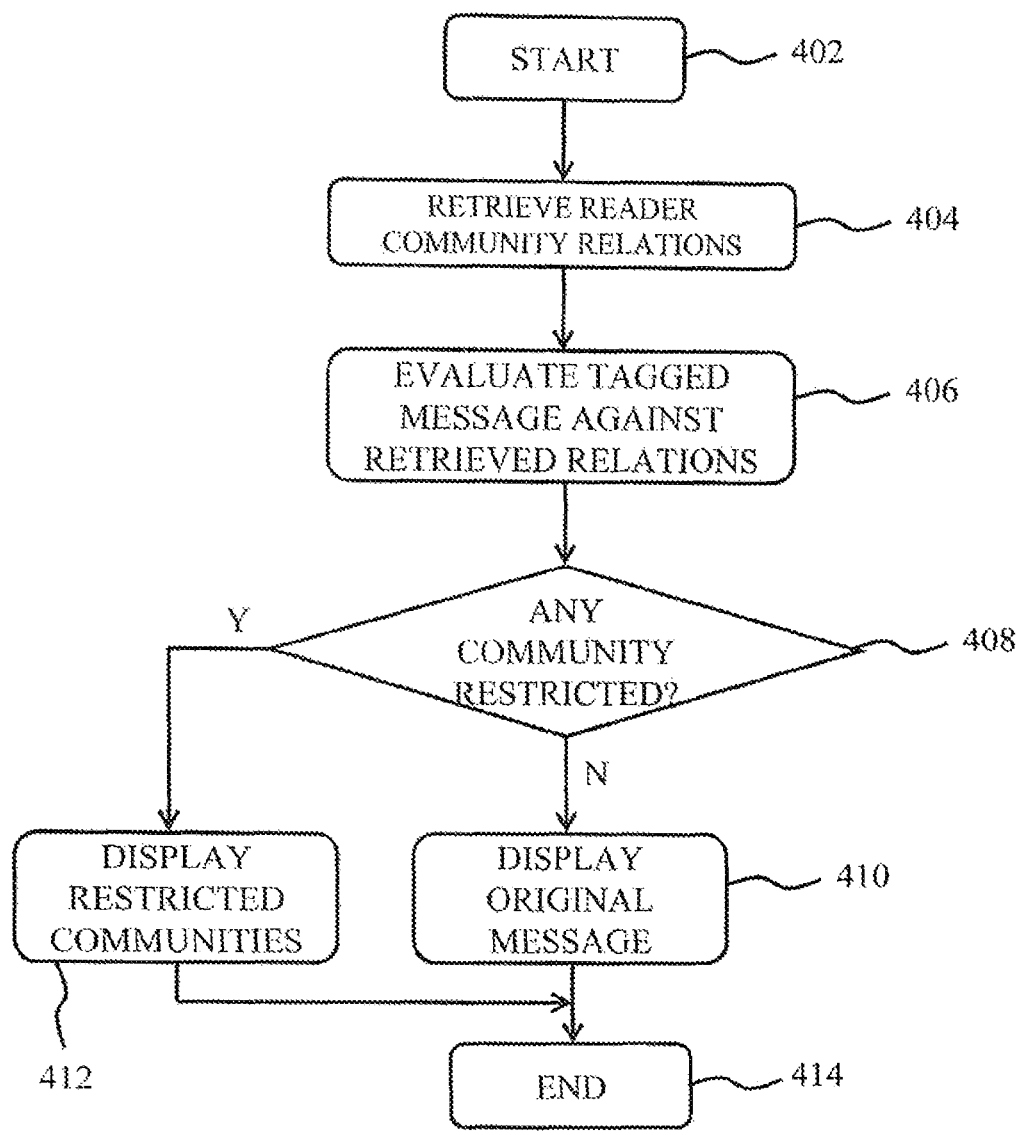
FIG. 7 is a flowchart of an electronic message content control method according to yet another aspect.

As previously mentioned, the electronic messaging system may include a link to the original message 10 in a redacted message displayed to a reader. In case such a reader attempts to access the original message, a decision making process has to be invoked that the checks if the reader is in fact entitled to gain access to the original message. FIG. 7 depicts a flowchart of an example embodiment of a method 400 implementing such a decision making process. The method starts in step 402 by the reader of the tagged message clicking the link to the original message. This triggers the execution of step 404 in which the communities to which the reader is related are retrieved, e.g. from a user profile of the reader, after which the method proceeds to step 406 in which the lexicons of these communities and/or global or local access rules set by the administrator to indicate which communities may access what type of content are retrieved.

In step 408, it is subsequently checked if the original message contains any content for which access has been restricted for any of the communities to which the reader is related. If no such restrictions apply to any of the communities to which the reader is related, the method proceeds to step 410 in which the original message is displayed to the reader, with the method ending at step 414. However, in at least one of the communities to which the reader is related is prevented from gaining access to at least some of the content in the original message, the method proceeds to step 412 in which the reader is informed that access to the original message is refused, which information may further comprise a list of the communities to which the reader is related such that the reader may contact such communities, e.g. their administrators, if so desired in order to seek further information, e.g. clarification, from these communities regarding the content of interest, with the method ending at step 414.

In the above embodiments, posted messages are tagged with metadata 30 in order to facilitate the redacting of those messages using the metadata 30. However, it should be understood that it is feasible to perform the redacting on-the-fly, in which case multiple redacted messages may be created that each are stored in the local domain of a particular community, such that different domains comprise differently redacted versions of the same message, thereby obviating the need for the inclusion of the metadata 30 in the messages. This of course comes at the expense of message duplication across the electronic messaging system and may be less suitable for messaging systems where users routinely have access to the message domains of multiple communities.

Figure 8:
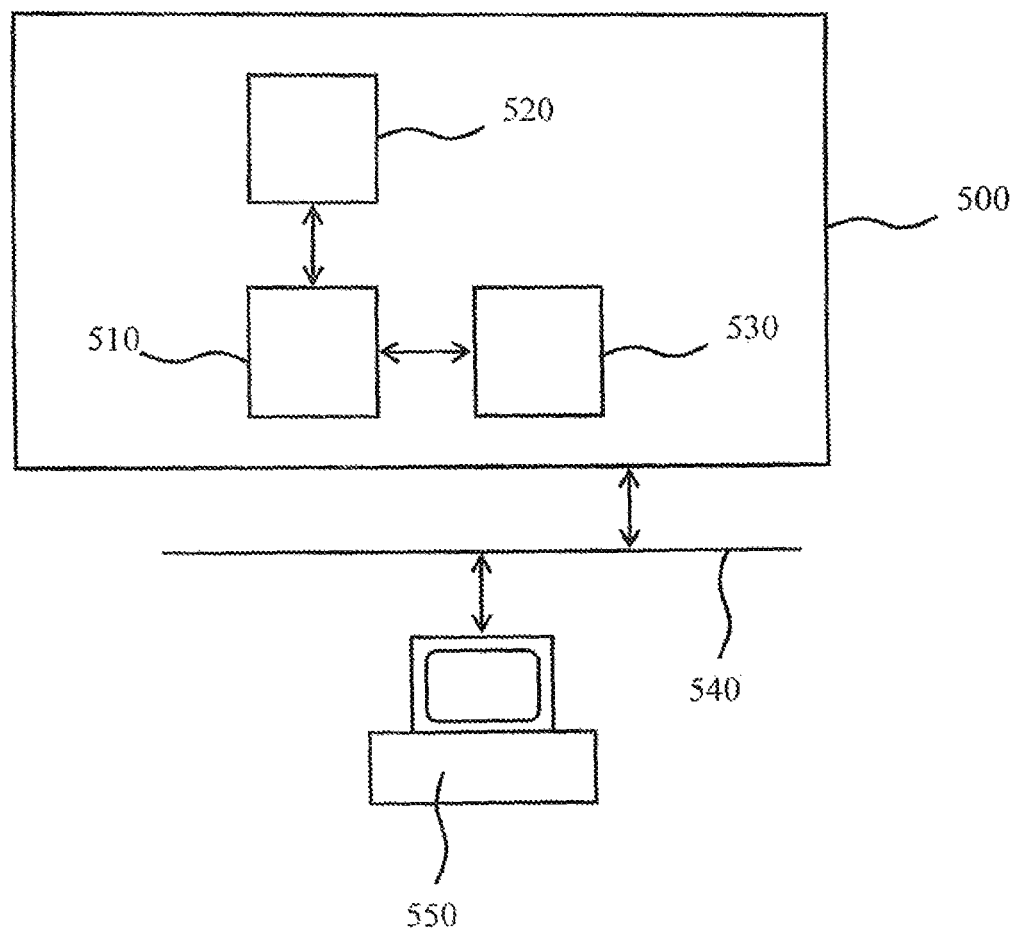
FIG. 8 schematically depicts a computer system according to an embodiment.

FIG. 8 schematically depicts a computer system 500 including a processor arrangement 510, e.g. one or more processors, adapted to host an electronic messaging system according to an embodiment. The computer system 500 for instance may comprise a computer program product including a computer-readable medium 520 that is communicatively coupled to the processor arrangement 510 and that contains computer-readable instructions that can be executed by the processor arrangement 510, which instructions cause the processor arrangement 510 to implement one or more embodiments of the aforementioned methods of the present invention. Such a computer-readable medium 520 will be some form of data storage device or a data signal as will be explained in further detail below. The computer system 500 may further comprise a further computer-readable medium 530 that stores the electronic messages 10 of the electronic messaging system hosted by the computer system 500. Any suitable computer-readable medium 530 may be contemplated, such as a data storage medium physically integrated in a computer system 500 or attached to the computer system 500, e.g. through a network such as a local area network or the Internet, e.g. the computer-readable medium 530 may be cloud-based. In an alternative embodiment, the computer-readable medium 520 and the further computer-readable medium 530 may form part of a single medium, e.g. a single data storage device or the like.

The computer system 500 is typically connected to a network 540 through a network interface (not shown) for providing a remote client 550 access to the computer system 500 over the network 540. Such a remote client by 50 for instance may be a remote personal computer, a portable device such as a smart phone, tablet, personal digital assistant, and so on. The network 540 may be a wireless network, e.g. a wireless LAN, a 3G or 4G mobile communications network, and so on or may be a wired network, e.g. a LAN, WAN and so on. In an embodiment, the network 540 may provide the physical backbone of a connection of the computer system 500 to the Internet or a restricted network such as an enterprise Intranet or any other suitable type of data communication network as will be immediately apparent to the skilled person.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart, illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the scope of this invention.

The invention claimed is:

1. A method for controlling content of an electronic message on an electronic messaging system including a plurality of community message boards, the method comprising:
   providing, by the electronic messaging system, a separate electronic lexicon for each community message board in the plurality of community message boards, each electronic lexicon defining content relevant to its associated community message board, wherein the content relevant to the community message board is identified based on a weight factor of one or more terms related to the content in the electronic messages;

determining, by the electronic messaging system, a confidence score for each community message board the user is a member of;

interpreting, by the electronic messaging system, the electronic message for disclosure to a particular community message board to identify content in the electronic message relating to content in the electronic lexicon of the particular community message board based on the electronic lexicon of the community message board having a highest confidence score;

redacting, by the electronic messaging system, one or more pieces of irrelevant content in the electronic message based on identifying related content using the electronic lexicon of the particular community message board and any other content in the electronic message that is not in the electronic lexicon of the particular community message board being identified as the one or more pieces of irrelevant content and based on the electronic lexicon of the community message board having a highest confidence score, forming a redacted electronic message; and posting, by the electronic messaging system, the redacted electronic message to the particular community message board controlled by the electronic messaging system.

2. The method of claim 1, wherein interpreting the electronic message for disclosure to the particular community message board further comprises:

tagging, by the electronic messaging system, content in the electronic message with metadata including redaction instructions, wherein redacting the one or more pieces of irrelevant content in the electronic message further comprises:

redacting, by the electronic messaging system, the tagged content in accordance with the redaction instructions.

3. The method of claim 1, wherein interpreting the electronic message for disclosure to the particular community message board further comprises:

performing, by the electronic messaging system, an evaluation of a part of the electronic message to determine whether the part of the electronic message contains content related to the content in the electronic lexicon.

4. The method of claim 1, further comprising:

performing, by the electronic messaging system, the interpreting of the electronic message for disclosure to the particular community message board and the redaction of the one or more pieces of irrelevant content in the electronic message in response to a user being a member of the particular community message board trying to access or share the electronic message.

5. The method of claim 4, wherein performing the interpreting of the electronic message for disclosure to the particular community message board and the redaction of the one or more pieces of irrelevant content in the electronic message comprises:

amending, by the electronic messaging system, redaction instructions for the electronic message based on the lexicon of the particular community message board of which the user is a member.

6. The method of claim 1, further comprising:

performing, by the electronic messaging system, the interpreting of the electronic message for disclosure to the particular community message board and the redaction of the one or more pieces of irrelevant content in the electronic message prior to posting of the electronic message to the electronic messaging system by the author of the electronic message.

7. The method of claim 6, further comprising:

identifying, by the electronic messaging system, community message boards of which the author is a member; and repeating, by the electronic messaging system, the interpreting of the electronic message for disclosure to the particular community message board and the redaction of the one or more pieces of irrelevant content in the electronic message for each of the identified community message boards.

8. The method of claim 6, further comprising:

providing, by the electronic messaging system, the author of the electronic message with redaction feedback in response to performing the interpreting of the electronic message for disclosure to the particular community message board prior to posting of the electronic message to the electronic messaging system.

9. The method of claim 1, wherein the redaction of the one or more pieces of irrelevant content in the electronic message comprises at least one of:

expanding, by the electronic messaging system, content relevant to the particular community message board;

inserting, by the electronic messaging system, a link to the electronic message in the redacted electronic message; or renaming, by the electronic messaging system, content in the electronic message in accordance with renaming rules defined for the particular community message board.

10. The method of claim 9, further comprising:

checking, by the electronic messaging system, whether a reader of the redacted electronic message is allowed to access to the electronic message upon the reader trying to access the electronic message via the link by checking which community message boards the reader is associated with; and preventing, by the electronic messaging system, the access in response to the reader being associated with a community message board for which the electronic message has been redacted.

11. The method of claim 1, wherein:

the interpreting of the electronic message for disclosure to the particular community message board comprises determining a score for content in the electronic message expressing a confidence level regarding a relevance of the content for the particular community message board; and the redaction of the one or more pieces of irrelevant content in the electronic message comprises redacting the electronic message as a function of the score.

12. The method of claim 1, wherein the redaction of the one or more pieces of irrelevant content in the electronic message further comprises:

redacting, by the electronic messaging system, the electronic message based on global administration settings.

13. The method of claim 1, wherein providing the separate electronic lexicon comprises:

evaluating, by the electronic messaging system, electronic messages posted to the community message board of the separate electronic lexicon to identify the content relevant to the community message board.

14. The method of claim 13, further comprising:

adjusting, by the electronic messaging system, the separate electronic lexicon based on relevant content in electronic messages added to or removed from the community message board.

15. A computer program product comprising a non-transitory computer-readable storage medium having a computer-readable program stored therein, wherein the computer-readable program, when executed on a computer system, causes the computing device to:
provide a separate electronic lexicon for each community message board in a plurality of community message boards, each electronic lexicon defining content relevant to its associated community message board, wherein the content relevant to the community message board is identified based on a weight factor of one or more terms related to the content in the electronic messages;
determining, by the electronic messaging system, a confidence score for each community message board the user is a member of;
interpret the electronic message for disclosure to a particular community message board to identify content in the electronic message relating to content in the electronic lexicon of the particular community message board based on the electronic lexicon of the community message board having a highest confidence score;
redact one or more pieces of irrelevant content in the electronic message based on identifying related content using the electronic lexicon of the particular community message board and any other content in the electronic message that is not in the electronic lexicon of the particular community message board being identified as the one or more pieces of irrelevant content and based on the electronic lexicon of the community message board having a highest confidence score, forming a redacted electronic message; and
post the redacted electronic message to the particular community message board controlled by the electronic messaging system.

16. An electronic messaging system comprising:
a processor; and
a memory coupled to the processor, wherein the memory comprises instructions which, when executed by the processor, cause the processor to:
provide a separate electronic lexicon for each community message board in a plurality of community message boards, each electronic lexicon defining content relevant to its associated community message board, wherein the content relevant to the community message board is identified based on a weight factor of one or more terms related to the content in the electronic messages;
determining, by the electronic messaging system, a confidence score for each community message board the user is a member of;
interpret the electronic message for disclosure to a particular community to identify content in the electronic message relating to content in the electronic lexicon of the particular community message board based on the electronic lexicon of the community message board having a highest confidence score;
redact one or more pieces of irrelevant content in the electronic message based on identifying related content using the electronic lexicon of the particular community message board and any other content in the electronic message that is not in the electronic lexicon of the particular community message board being identified as the one or more pieces of irrelevant content and based on the electronic lexicon of the community message board having a highest confidence score, forming a redacted electronic message; and
post the redacted electronic message to the particular community message board controlled by the electronic messaging system.

17. The computer system of claim 16, wherein the instructions to interpret the electronic message for disclosure to the particular community message board further causes the processor to:
tag content in the electronic message with metadata including redaction instructions, wherein redacting the one or more pieces of irrelevant content in the electronic message further comprises:
redact the tagged content in accordance with the redaction instructions.

18. The computer system of claim 16, wherein the instructions to interpret the electronic message for disclosure to the particular community message board further causes the processor to:
perform an evaluation of a part of the electronic message to determine whether the part of the electronic message contains content related to the content in the electronic lexicon.

* * * * *